United States Patent
Recker et al.

(10) Patent No.: US 9,342,967 B2
(45) Date of Patent: May 17, 2016

(54) MOTION ACTIVATED OFF GRID LED LIGHT

(75) Inventors: Michael V. Recker, Gaithersburg, MD (US); David B. Levine, Pepper Pike, OH (US)

(73) Assignee: Wireless Environment, LLC, Solon, OH (US)

(*) Notice: Subject to any disclaimer, the term of this patent is extended or adjusted under 35 U.S.C. 154(b) by 0 days.

(21) Appl. No.: 13/469,705

(22) Filed: May 11, 2012

(65) Prior Publication Data

US 2012/0223646 A1 Sep. 6, 2012

Related U.S. Application Data

(63) Continuation of application No. 11/692,075, filed on Mar. 27, 2007, now Pat. No. 8,203,445.

(60) Provisional application No. 60/786,636, filed on Mar. 28, 2006.

(51) Int. Cl.
*H04Q 1/30* (2006.01)
*G08B 5/36* (2006.01)
*H05B 37/02* (2006.01)
*F21S 9/02* (2006.01)
*F21V 23/04* (2006.01)
*F21Y 101/02* (2006.01)

(52) U.S. Cl.
CPC ... *G08B 5/36* (2013.01); *F21S 9/02* (2013.01); *F21V 23/045* (2013.01); *H05B 37/0227* (2013.01); *H05B 37/0272* (2013.01); *F21Y 2101/02* (2013.01)

(58) Field of Classification Search
USPC ................ 340/13.24, 13.25, 13.26
See application file for complete search history.

(56) References Cited

U.S. PATENT DOCUMENTS 3,786,575 A * 1/1974 Riblett .............................. 34/99
3,938,080 A * 2/1976 Hulme ..................... G08B 5/38
331/113 R
4,323,820 A 4/1982 Teich
(Continued)

FOREIGN PATENT DOCUMENTS

WO WO-2009029960 3/2009
WO WO-2010063001 6/2010

OTHER PUBLICATIONS

U.S. Appl. No. 11/847,509 Final Rejection, mailed Feb. 4, 2011, 6 pgs.
(Continued)

*Primary Examiner* — Quang D Pham
(74) *Attorney, Agent, or Firm* — Finnegan, Henderson, Farabow, Garrett & Dunner, LLP

(57) ABSTRACT

The claimed subject matter provides systems and/or methods that facilitate remotely controlling a wireless lighting module. The wireless lighting module can include a power source such as a battery, a solar cell, and the like as well as an array of light emitting diodes (LEDs). The LEDs can be controlled based upon a received input (e.g., communicated by way of a radio frequency signal, an infrared signal, ... ). For example, the input can be obtained from a remote control, a sensor, a differing wireless lighting module, an radio frequency identification (RFID) tag, and so forth. The input can be utilized to switch one or more LEDs on or off, change the intensity or color of illumination, modulate illumination, alter the direction of illumination, etc.

7 Claims, 9 Drawing Sheets

(56) References Cited

U.S. PATENT DOCUMENTS

| | | | | |
|---|---|---|---|---|
| 4,558,402 | A * | 12/1985 | Tysoe | 362/293 |
| 4,841,278 | A * | 6/1989 | Tezuka | F21S 9/037 340/331 |
| 4,854,690 | A | 8/1989 | Mehr | |
| 4,963,798 | A | 10/1990 | McDermott | |
| 5,126,634 | A | 6/1992 | Johnson | |
| 5,293,097 | A * | 3/1994 | Elwell | H05B 37/02 240/214 AL |
| 5,349,330 | A * | 9/1994 | Diong et al. | 340/567 |
| 5,357,170 | A * | 10/1994 | Luchaco et al. | 315/159 |
| 5,442,177 | A * | 8/1995 | Boulos et al. | 250/342 |
| 5,489,827 | A * | 2/1996 | Xia | H05B 37/0227 315/154 |
| 5,489,891 | A * | 2/1996 | Diong et al. | 340/567 |
| 5,498,931 | A * | 3/1996 | Bedocs | H05B 37/0227 250/214 R |
| 5,552,767 | A * | 9/1996 | Toman | G08B 5/006 340/331 |
| 5,575,557 | A * | 11/1996 | Huang et al. | 362/276 |
| 6,010,228 | A | 1/2000 | Blackman et al. | |
| 6,078,253 | A * | 6/2000 | Fowler | 340/501 |
| 6,107,930 | A * | 8/2000 | Behlke | G08B 13/19 340/3.7 |
| 6,122,678 | A * | 9/2000 | Eckel et al. | 710/15 |
| 6,140,934 | A * | 10/2000 | Lam | 340/815.4 |
| 6,166,496 | A * | 12/2000 | Lys | H05B 33/0857 315/292 |
| 6,166,627 | A | 12/2000 | Reeley | |
| RE37,135 | E * | 4/2001 | Elwell | H05B 37/02 250/214 AL |
| 6,340,864 | B1 * | 1/2002 | Wacyk | 315/158 |
| 6,404,079 | B1 * | 6/2002 | Hsieh | 307/117 |
| 6,548,967 | B1 | 4/2003 | Dowling et al. | |
| 6,685,332 | B1 * | 2/2004 | Clark | E04F 11/163 362/145 |
| 6,703,788 | B1 | 3/2004 | Miller et al. | |
| 6,744,223 | B2 * | 6/2004 | Laflamme et al. | 315/291 |
| 6,759,954 | B1 | 7/2004 | Myron et al. | |
| 6,759,966 | B1 | 7/2004 | Weng | |
| 6,808,287 | B2 | 10/2004 | Lebens et al. | |
| 6,812,855 | B1 * | 11/2004 | Sudou | G08G 1/096716 340/539.1 |
| 6,819,239 | B2 | 11/2004 | Bingham | |
| 6,894,609 | B2 * | 5/2005 | Menard et al. | 340/531 |
| 6,953,260 | B1 * | 10/2005 | Allen | 362/194 |
| 6,957,043 | B2 | 10/2005 | Angermann et al. | |
| 6,960,892 | B2 | 11/2005 | Loughrey | |
| 6,965,205 | B2 | 11/2005 | Piepgras et al. | |
| 6,979,100 | B2 | 12/2005 | Reiff et al. | |
| 7,027,736 | B1 * | 4/2006 | Mier-Langner et al. | 398/106 |
| 7,031,920 | B2 | 4/2006 | Dowling et al. | |
| 7,109,880 | B2 | 9/2006 | Sibalich et al. | |
| 7,190,126 | B1 * | 3/2007 | Paton | 315/308 |
| 7,218,056 | B1 | 5/2007 | Harwood | |
| 7,227,444 | B2 | 6/2007 | Fitzgibbon | |
| 7,309,965 | B2 | 12/2007 | Dowling et al. | |
| 7,352,339 | B2 | 4/2008 | Morgan et al. | |
| 7,369,060 | B2 * | 5/2008 | Veskovic et al. | 340/4.3 |
| 7,385,359 | B2 | 6/2008 | Dowling et al. | |
| 7,429,919 | B2 | 9/2008 | Silic | |
| 7,476,002 | B2 | 1/2009 | Wolf et al. | |
| 7,486,883 | B2 | 2/2009 | McNary | |
| 7,498,952 | B2 | 3/2009 | Newman, Jr. | |
| 7,529,594 | B2 | 5/2009 | Walters et al. | |
| 7,604,370 | B2 * | 10/2009 | Dowdy et al. | 362/199 |
| 7,626,339 | B2 | 12/2009 | Paton | |
| 7,639,115 | B2 | 12/2009 | Valoteau et al. | |
| 7,688,222 | B2 * | 3/2010 | Peddie | E01F 9/065 116/63 P |
| 7,866,838 | B2 * | 1/2011 | Wang et al. | 362/85 |
| 9,142,130 | B1 * | 9/2015 | Dukish | G08G 1/164 |
| 2002/0171365 | A1 | 11/2002 | Morgan et al. | |
| 2003/0095406 | A1 | 5/2003 | Lebens et al. | |
| 2003/0141819 | A1 | 7/2003 | Cojocary | |
| 2004/0036603 | A1 * | 2/2004 | Bingham | 340/541 |
| 2004/0212321 | A1 | 10/2004 | Lys et al. | |
| 2005/0099824 | A1 | 5/2005 | Dowling et al. | |
| 2005/0104747 | A1 * | 5/2005 | Silic et al. | 340/944 |
| 2005/0231134 | A1 | 10/2005 | Sid | |
| 2005/0243549 | A1 * | 11/2005 | Ruston | 362/233 |
| 2005/0248930 | A1 | 11/2005 | Naval et al. | |
| 2005/0259416 | A1 * | 11/2005 | Gauna et al. | 362/227 |
| 2006/0044152 | A1 * | 3/2006 | Wang | 340/825 |
| 2006/0146527 | A1 | 7/2006 | VanderSchuit | |
| 2006/0170380 | A1 * | 8/2006 | Evans | 315/312 |
| 2006/0176689 | A1 * | 8/2006 | Dowdy et al. | 362/188 |
| 2006/0238136 | A1 * | 10/2006 | Johnson, III et al. | 315/185 R |
| 2006/0278816 | A1 * | 12/2006 | Booty | 250/221 |
| 2007/0030148 | A1 * | 2/2007 | Gabriel et al. | 340/540 |
| 2007/0043540 | A1 | 2/2007 | Cleland et al. | |
| 2007/0097793 | A1 * | 5/2007 | Nguy | G04G 15/006 368/15 |
| 2007/0100571 | A1 * | 5/2007 | Miki | 702/96 |
| 2007/0189001 | A1 * | 8/2007 | Nielson et al. | 362/16 |
| 2007/0195526 | A1 | 8/2007 | Dowling et al. | |
| 2007/0211461 | A1 | 9/2007 | Harwood | |
| 2007/0247414 | A1 * | 10/2007 | Roberts | 345/102 |
| 2007/0273500 | A1 * | 11/2007 | Chiu | H05B 37/0272 340/522 |
| 2007/0273539 | A1 * | 11/2007 | Gananathan | 340/615 |
| 2007/0290887 | A1 | 12/2007 | Pleasanton | |
| 2008/0043471 | A1 * | 2/2008 | Musgrove et al. | 362/276 |
| 2008/0074872 | A1 * | 3/2008 | Panotopoulos | 362/231 |
| 2008/0186173 | A1 * | 8/2008 | Gates | 340/542 |
| 2008/0204230 | A1 * | 8/2008 | Steinel et al. | 340/565 |
| 2008/0218334 | A1 * | 9/2008 | Pitchers et al. | 340/539.1 |
| 2008/0232082 | A1 | 9/2008 | Martinez | |
| 2009/0284155 | A1 * | 11/2009 | Reed et al. | 315/32 |
| 2010/0141153 | A1 | 6/2010 | Recker et al. | |
| 2013/0293118 | A1 * | 11/2013 | Nagashima et al. | 315/155 |

OTHER PUBLICATIONS

International Preliminary Report on Patentability, PCT/US2008/081807, Issue date of report Mar. 2, 2010, 6 pgs.

Written Opinion of the International Search Authority, PCT/US2008/081807, Mail date Mar. 2, 2009, 5 pgs.

ISR, PCT/US2009/066003, Search Report and Written Opinion, mailed Mar. 4, 2010; 11 pgs.

U.S. Appl. No. 11/847,509, Non-Final Office Action Received, Oct. 8, 2010, 7 pgs.

U.S. Appl. No. 11/847,509, Final Office Action mailed May 17, 2010, 6 pgs.

U.S. Appl. No. 12/626,640 Non Final Office action received, Sep. 1, 2010, 7 pgs.

U.S. Appl. No. 12/626,640 Non Final Office action received, Sep. 30, 2010, 7 pgs.

U.S. Appl. No. 12/626,640 Final Office action received, Dec. 27, 2010, 8 pgs.

"U.S. Appl. No. 11/847,509, Non-Final Office Action mailed Sep. 17, 2009", 14 pgs.

"PCT/US08/081807", Mar. 5, 2009.

ISR, "PCT/US2009/066003, Search Report and Written Opinion mailed Mar. 4, 2010", 11 pgs.

* cited by examiner

MOTION ACTIVATED OFF GRID LED LIGHT

CROSS-REFERENCE TO RELATED APPLICATIONS

This is a continuation of Application No. 11/692,075, filed Mar. 27, 2007, now U.S. Pat. No. 8,203,445 the entirety of which is incorporated herein by reference. This application claims the benefit of U.S. Provisional Application No. 60/786,636 which was filed Mar. 28, 2006. The entirety of the aforementioned applications are incorporated herein by reference.

TECHNICAL FIELD

The present application relates to wireless lighting. More particularly, the present application relates to remote controlled, wireless LED lighting systems and methods.

BACKGROUND

Light can be yielded by a variety of sources. For instance, combustion-based sources, electric sources, and the like can generate light, which can be employed for various illumination purposes. Combustion-based sources include fires, torches, candles, kerosene lamps, etc.; however, combustion-based lighting can present safety concerns, and thus, may be impractical for various types of lighting situations. Electric sources such as incandescent lamps, electroluminescent lamps, gas discharge lamps, high-intensity discharge lamps, and so forth can mitigate potential for harm associated with combustion-based sources. Nevertheless, when conventional electric sources are employed to illuminate indoor or outdoor areas, significant amounts of time and costs (e.g., related to wiring) are commonly incurred for installation (e.g., to hard-wire a fixture or an outlet to be utilized by a portable lamp) in a desired location and/or replacement. Moreover, portable lamps oftentimes have cords that can be aesthetically unpleasing, easily unplugged and/or can present additional safety concerns (e.g., an individual can trip over a cord, a pet can chew on the cord, an overloaded outlet with too many items plugged in can increase a chance of fire, . . . ).

Use of battery-operated lighting devices are known in the prior art. In one known embodiment, incandescent or fluorescent light bulbs are disposed in a housing having a battery and an on/off switch. The housing is configured to be mounted to a wall, ceiling, cabinet, or other surface. In another known embodiment, arrays of light emitting diodes (LEDs) are used in place of fluorescent or incandescent light bulbs.

Additionally, remote controlled lighting devices are also known in the art. In one known embodiment, a light source is controlled by a radio-frequency (RF) emitting remote control, where an RF receiver can screw into a hard-wired light socket to control power of the light source. In another known embodiment, an LED source is controlled by an infrared (IR) light emitting remote control.

LEDs are solid state semiconductor devices that convert electrical energy into light. LEDs are made from a combination of semiconductors and generate light when current flows across the junctions of these materials. The color of the light produced by the LED is determined by the combination of materials used in its manufacture.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate remotely controlling a wireless lighting module. The wireless lighting module can include a power source such as a battery, a solar cell, and the like as well as an array of light emitting diodes (LEDs). The LEDs can be controlled based upon a received input (e.g., communicated by way of a radio frequency signal, an infrared signal, . . . ). For example, the input can be obtained from a remote control, a sensor, a differing wireless lighting module, an radio frequency identification (RFID) tag, and so forth. The input can be utilized to switch one or more LEDs on or off, change the intensity or color of illumination, modulate illumination, alter the direction of illumination, etc.

According to one or more aspects of the claimed subject matter, a wireless lighting module can include a housing of any size and/or shape. The housing can include a mounting device that allows the wireless lighting module to be positioned in substantially any indoor or outdoor location. Moreover, the wireless lighting module can include any type and/or number of batteries (e.g., non-rechargeable, rechargeable, . . . ) to supply power to any number of LEDs included in the wireless lighting module. Additionally, operation of the LEDs of the wireless lighting module can be controlled remotely by transmitted input signals (e.g., radio frequency signals, infrared signal, . . . ). As such, costly and time consuming wiring typically associated with installing, moving and/or replacing conventional lighting need not be effectuated in connection with the wireless lighting described herein.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
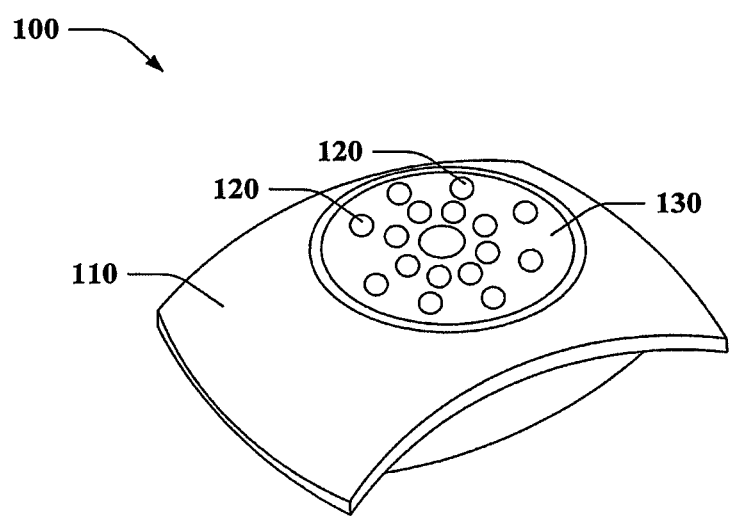
FIG. 1 illustrates a perspective view of one embodiment of a wireless lighting module.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The claimed subject matter is directed to wireless LED lighting. With reference to FIG. 1, illustrated is a perspective view of one embodiment of a wireless lighting module 100. In the illustrated embodiment, the wireless lighting module 100 includes a housing 110 and a plurality of LEDs 120. In one embodiment, the wireless lighting module 100 includes 16 LEDs. In alternative embodiments, the lighting module may include more LEDs 120 to provide greater illumination or fewer LEDs 120 to use less power. It is to be appreciated that the wireless lighting module 100 can include any number of LEDs 120, and the LEDs 120 can be positioned at substantially any locations with respect to one another as well as in comparison to the housing 110.

In one embodiment, the housing 110 is constructed of plastic. Alternatively, the housing 110 can be constructed of metal or any other known material. In one embodiment (not shown), the housing 110 includes a mounting device for mounting the wireless lighting module 100 to a wall, ceiling, cabinet, or other surface. Exemplary mounting devices include screws, nails, adhesive, suction cups, magnets, VEL-CRO®, fixing posts, flanged heads of fasteners, and other known mounting devices. In this embodiment, the housing 110 is configured to be mounted under a cabinet or desk, on a mailbox, or on a wall or ceiling of a room, closet, attic, basement, garage, storage area, shed, wall unit, hallway, stairway, emergency exit path, or cabinet, or in any other indoor or outdoor location where light may be desired. In one embodiment, one wireless lighting module (e.g., the wireless lighting module 100) illuminates an area of 20 square feet. It is to be appreciated that the housing 110 can be any size and/or shape and is not limited to the depicted illustration (e.g., the housing 110 can be dome shaped, pyramid shaped, cylindrical, . . . ). According to another example, the housing 110 can form a rope light.

With continued reference to FIG. 1, the LEDs 120 of the wireless lighting module 100 are arranged in an array to disperse light over a desired area. In alternative embodiments (not shown), one or more LEDs 120 are arranged in a spotlight to focus light over a desired area. In one embodiment, the LEDs 120 are white. In an alternative embodiment, the LEDs 120 are colored. In such an embodiment, all of the LEDs in the module 100 may be the same or different colors.

In the illustrated embodiment, the wireless lighting module 100 further includes a light-transmitting cover 130. In one embodiment, the light-transmitting cover 130 is transparent. Alternatively, the cover may be colored or frosted. In one embodiment, the light-transmitting cover 130 is smooth. In alternative embodiments, the cover may be etched or otherwise textured. The cover 130 may have any desired shape. In an alternative embodiment (not shown), the module does not include a light-transmitting cover. In another embodiment, the wireless lighting module includes a filter (not shown).

Figure 2:
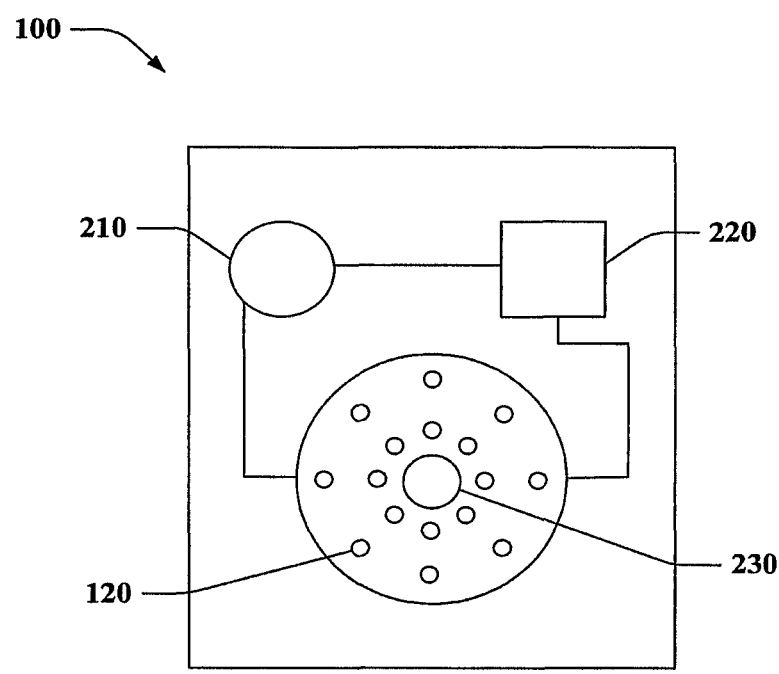
FIG. 2 illustrates a simplified schematic view of one embodiment of a wireless lighting module.

FIG. 2 shows a simplified top plan view of the wireless lighting module 100, with the housing 110 and cover 130 removed. As shown in the illustrated embodiment, the wireless lighting module 100 includes a power source, such as a battery 210. In alternative embodiments, the power source may be a solar cell. In one known embodiment, three "AAA" size alkaline batteries are used as a power source. In an alternative embodiment, three "C" size alkaline batteries are used. It should be understood that any number of known batteries may be used, including without limitation all known alkaline and nickel-cadmium batteries, depending on size and power requirements. According to another example, the power source can be any number and type of rechargeable batteries and/or non-rechargeable batteries. Pursuant to a further illustration, the power source can be a combination of a solar cell and one or more batteries (e.g., rechargeable, non-rechargeable, . . . ). Thus, for instance, a battery can supplement the power supplied by the solar cell (or vice versa) and/or the solar cell can recharge a battery.

As shown, the battery 210 is electrically connected to the LEDs 120 to provide power for the light output. The battery 210 is also connected to a receiver 220 configured to receive a data stream. In one embodiment, the receiver 220 is configured to receive a data stream in the form of RF signals and is further configured to output data to logic 230. In one embodiment, the receiver 220 is configured to receive data at up to 100 kbps and has a receive sensitivity of as little as −115 dBm. In an alternative embodiment, the receiver 220 is configured to receive IR signals.

In one embodiment, the receiver 220 includes an integrated processor (not shown). The integrated processor of the receiver 220 is separate from the logic 230 of the wireless lighting module 100. The integrated processor is configured to convert an RF or IR data stream to digital data output. The integrated processor may be an integrated circuit, a microprocessor, or other known processor. For example, the receiver 220 may be a commercially available Maxim MAX1470 RF Integrated Circuit 300-450 MHz ASK Superheterodyne receiver.

With continued reference to FIG. 2, the battery 210 is also connected to the logic 230. The logic 230 is configured to monitor data received by the receiver 220. In one embodiment, described above, the receiver 220 outputs digital data. In an alternative embodiment, the receiver 220 outputs analog data and the logic 230 is configured to convert the analog data to digital data. The logic 230 is configured to detect specific sequences of data, such as commands and channel data, as will be described in more detail below. The logic 230 may be an integrated circuit, a microprocessor, or any known type of processor. For example, the logic 230 may be a commercially available Freescale Semiconductor MC68HC908QT microcontroller.

In one embodiment, the logic 230 employs a power sequencing algorithm to conserve power. In this embodiment, the logic 230 stays in a "hibernation" mode to conserve power. The logic 230 is activated a few times per second to monitor the receiver 220. If the logic 230 detects output from the receiver 220, the logic 230 reads the data and executes commands according to a protocol described below. If the logic 230 does not detect output from the receiver 220, it returns to hibernation mode.

The logic 230 is also in electric communication with the LEDs 120. The logic 230 maintains the on/off state of the LEDs 120. Additionally, the logic 230 may be configured to control the brightness of the LEDs 120. In one embodiment, the logic 230 is configured to turn off the LEDs 120 after a predetermined amount of time to conserve power. The logic 230 is also configured to control pulse width modulation to extend battery life.

In one embodiment, the LEDs 120 are color changing LEDs and the logic 230 is configured to control the color emitted by the LEDs 120. In one embodiment (not shown), when more than one wireless lighting module is employed, the modules may be synchronized such that the logic of each module changes the light color at the same time or according to a user preference.

Figure 3:
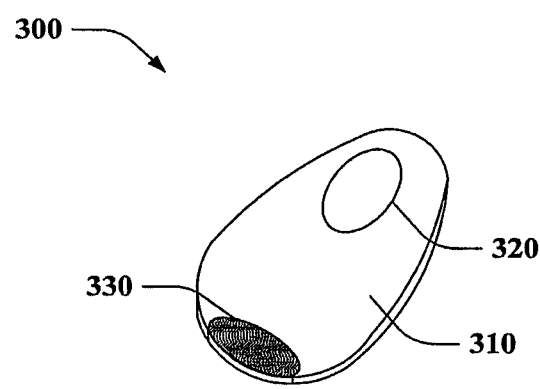
FIG. 3 illustrates a perspective view of one embodiment of a remote control for a wireless light.

FIG. 3 illustrates a perspective view of one embodiment of a remote control 300 for a wireless lighting module (e.g., the wireless lighting module 100 of FIG. 1). The remote control 300 includes a housing 310. In one embodiment (not shown), the housing 310 is configured to be attached to a keychain. In another embodiment (not shown), the housing 310 is configured to be mounted to a wall.

In the illustrated embodiment, the remote control 300 includes a button 320 configured to receive user input. Here, the button 320 receives an on/off toggle command. In an alternative embodiment (not shown), the remote control 300 includes a plurality of buttons. The additional buttons may be configured to receive a separate "on" command and "off" command. The additional buttons may also be configured to receive a "dim" or "brightness" command or a color changing command. In another alternative embodiment (not shown), the remote control 300 further includes a dip switch for receiving a channel number. In other alternative embodiments (not shown), the remote control 300 employs dials, toggle switches, levers, knobs, buttons, or any other appropriate controls to receive user input. According to another example, the remote control 300 can utilize a touch panel for obtaining user input.

The remote control 300 further includes a transmitter 330 configured to transmit a signal. In one embodiment, the transmitter 330 is an RF transmitter. In an alternative embodiment, the transmitter 330 is an IR transmitter. In one embodiment, the transmitter 330 includes an integrated processor (not shown), such as a Maxim MAX 1472 RF Integrated Circuit 300-450 MHz ASK transmitter and is configured to transmit data at up to 100 kbps. According to another illustration, the remote control 300 can include a transceiver that can receive data from a wireless lighting module as well as transmit data to the wireless lighting module.

Figure 4:
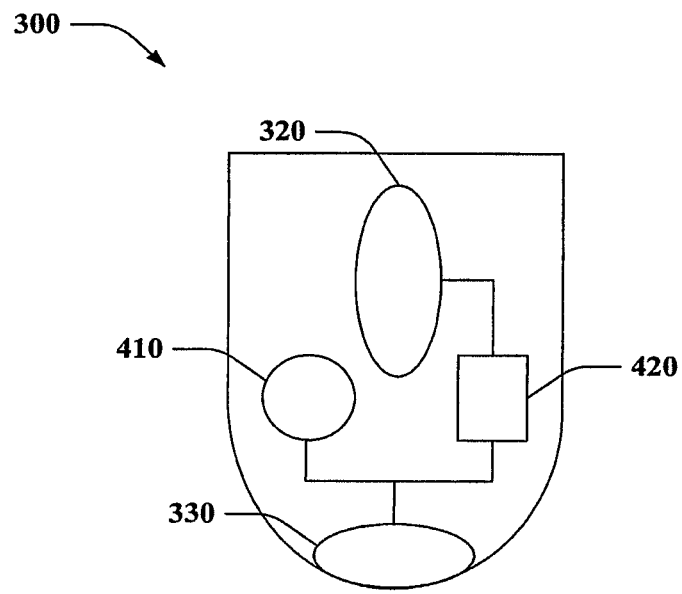
FIG. 4 illustrates a simplified schematic view of one embodiment of a remote control for a wireless light.

FIG. 4 illustrates a simplified top plan view of a remote control 300 with a housing 310 removed. The remote control 300 includes a power source, such as a battery 410. In one embodiment, the battery 410 is a CR2032 coin cell battery. In alternative embodiments, any number of any known type of battery may be used. The battery is electrically connected to and supplies power to the transmitter 330.

In the illustrated embodiment, the battery 410 is also connected to and supplies power to logic 420. The logic 420 is configured to monitor a switch (not shown) connected to the button 320. The logic 420 is further configured to build and send a control message to the transmitter 330. In one embodiment, the logic 420 sends a digital control message to the transmitter 330. An integrated circuit (not shown) of the transmitter 330 then converts the digital control message to an analog control message for transmission as an RF signal. In an alternative embodiment, the transmitter 330 is configured to transmit a digital RF signal. In another alternative embodiment, the logic 420 sends an analog control message to the transmitter 330.

In one embodiment, the logic 420 is configured to recognize an on/off toggle command. The logic 420 receives the on/off toggle command when a user presses the button 320. In another embodiment (not shown), the logic 420 is configured to recognize a separate "on" command and "off" command. In yet another embodiment (not shown), the logic 420 is configured to recognize a "dim" or "brightness" command or a "color change" command. When the logic 420 receives a command, the logic 420 outputs a control message containing the command and a channel number. In one embodiment, the logic 420 receives the channel number from a user input device. In an alternative embodiment, the logic 420 looks up the channel number in a memory (not shown). In another alternative embodiment, the processor generates a random number to use as a channel number.

Figure 5:
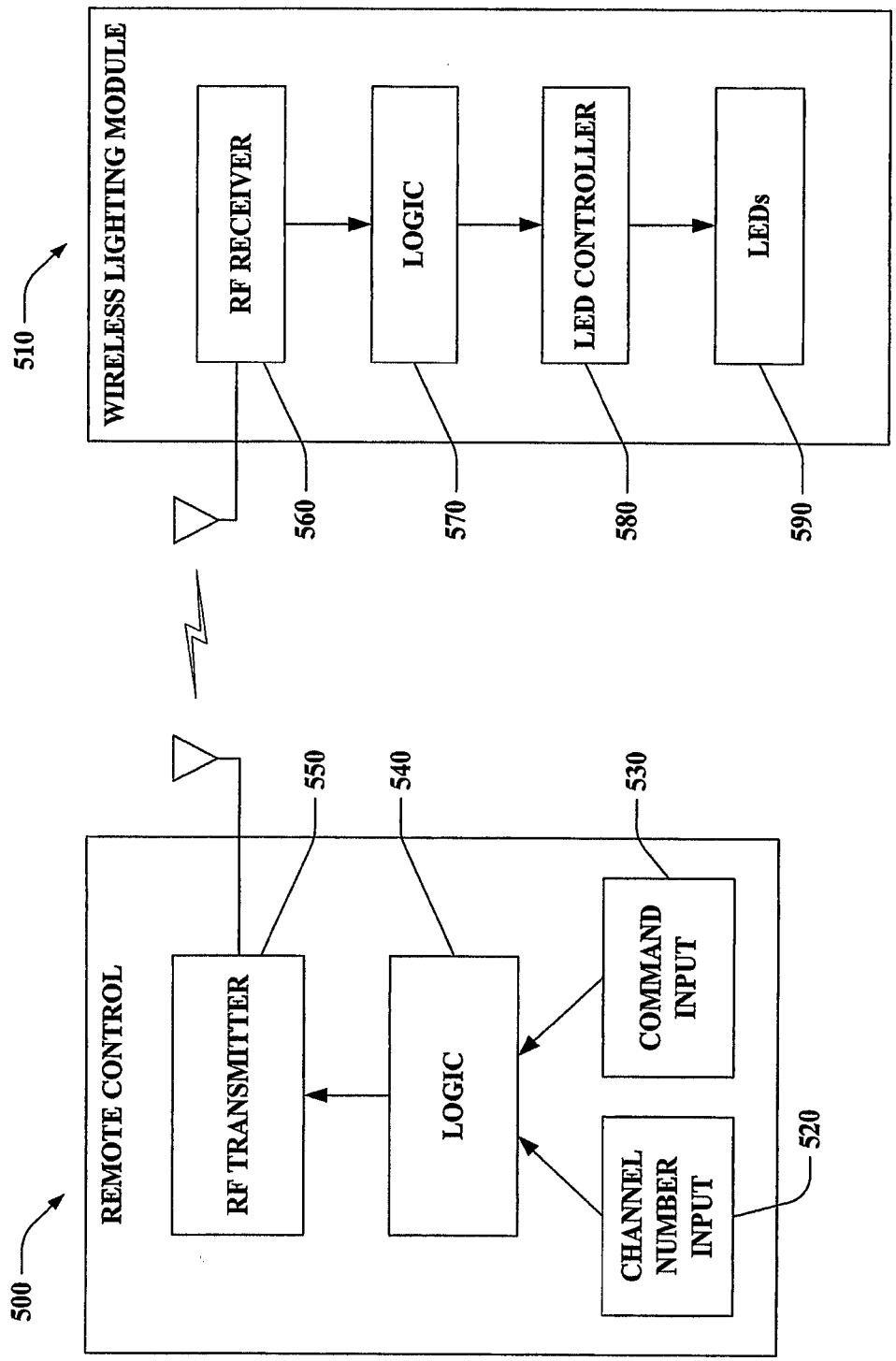
FIG. 5 illustrates a simplified schematic drawing of an RF communication system for controlling a light.

FIG. 5 is a schematic drawing of one embodiment of a remote control 500 in communication with a wireless lighting module 510. In the illustrated embodiment, the user selects a channel number on the remote control 500 through a channel number input 520. Exemplary channel number inputs 520 include dip switches, buttons, dials, knobs, a keypad, an LED touchscreen, or any other known input device. In an alternative embodiment, a user may select more than one channel number to communicate with a plurality of wireless lighting modules. In other alternative embodiments, the channel number may be preprogrammed, randomly generated, or previously stored in a memory. The user then enters a command through a command input 530. Exemplary command inputs 530 include buttons, switches, dials, knobs, a keypad, an LED touchscreen, or any other known input device. The command may be an "on/off" toggle command, an "on" command, an "off" command, a "dim" command, a "brightness" command, a "color change" command, or a timer command.

After a user inputs a command through the command input 530, logic 540 encodes the channel number and the command and instructs an RF transmitter 550 to transmit an RF signal that includes the encoded channel number and command. In one embodiment, the RF transmitter 550 transmits RF signals at a frequency of 433 MHz. In alternative embodiments, the RF transmitter may transmit at a user selected-frequency or at any predetermined frequency.

In one embodiment, the RF signal is transmitted once. In an alternative embodiment, the RF signal is transmitted a predetermined number of times, or for a predetermined time period. If more than one RF signal is transmitted, each transmission may be separated by a predetermined interval.

With continued reference to FIG. 5, the wireless lighting module 510 includes an RF receiver 560 that monitors for RF signals at a predetermined frequency. In one embodiment, the RF receiver 560 periodically monitors for RF signals. In an alternative embodiment, the RF receiver 560 continuously monitors for RF signals. When an RF signal is received, the signal is transmitted to logic 570, where the signal is decoded: In one embodiment, the logic 570 reads the decoded channel number and compares the decoded channel number to a module channel number. The module channel number may be selected by a user via a channel input device (not shown), or it may be pre-programmed.

If the decoded channel number matches the module channel number, the logic 570 processes the decoded command. For example, if the command is an on/off toggle command, the logic 570 will instruct an LED controller 580 to toggle a plurality of LEDs 590. If the command is an "on" command, the logic 570 will determine if the plurality of LEDs 590 are in an "on" state. If the LEDs 590 are not in an "on" state, the logic 570 will instruct the LED controller 580 to activate the plurality of LEDs 590.

In an alternative embodiment (not shown), the RF transmitter 550 and the RF receiver 560 are replaced with RF transceivers, thus allowing two-way communication. In this embodiment, the remote control is programmed to repeatedly transmit a command signal until a confirmation signal is received. Additionally, the lighting module is programmed to transmit a confirmation signal upon receipt of an RF signal, or upon a decoded channel number matching a module channel number. According to another example, RF transceivers can enable providing the remote control 500 with feedback concerning a state associated with the wireless lighting module 510 (e.g., whether the LEDs 590 are in an "on" state, an "off" state, a color of the LEDs 590, an intensity of the LEDs 590, . . . ), battery life, and so forth. Moreover, RF transceivers can allow the wireless lighting module 510 to communicate with disparate wireless lighting module(s) (e.g., to repeat signals).

Figure 6:
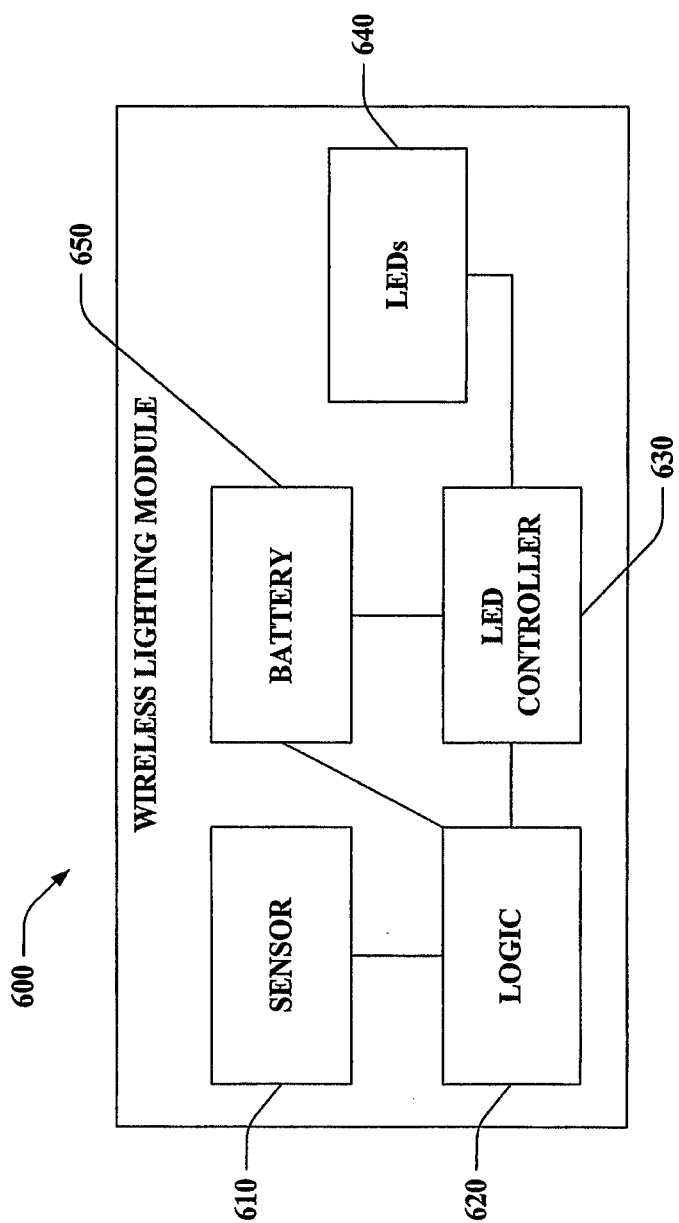
FIG. 6 illustrates a simplified schematic drawing of an alternative embodiment of a wireless lighting module.

FIG. 6 is a schematic drawing of an alternative embodiment of a wireless lighting module 600. In this embodiment, the wireless lighting module 600 is not controlled by a remote control, but is instead motion-controlled. The wireless lighting module 600 includes a passive infrared sensor 610 configured to detect motion. In one embodiment, the passive infrared sensor 610 has a range of approximately 5 feet and a viewing angle of 110 degrees. In alternative embodiments, the passive infrared sensor 610 may have a range and viewing angle of any known passive infrared sensor. In one alternative embodiment, the passive infrared sensor 610 is removably connected to the wireless lighting module 600 so that a user may connect any appropriate sensor.

With continued reference to FIG. 6, when the sensor 610 detects motion, logic 620 determines if the motion is above a predetermined threshold. If the motion is above the predetermined threshold, the logic 620 instructs an LED controller 630 to turn on at least one LED 640. After the at least one LED 640 is turned on, the logic 620 starts a timer. The logic 620 will then instruct the LED controller 630 to turn off the at least one LED 640 if no motion is detected before the timer reaches a predetermined threshold.

The wireless lighting module 600 further includes at least one battery 650. The battery 650 supplies power to the logic 620, the LED controller 630, the at least one LED 640, and any other additional electric components. Further, the battery 650 can supply power to the sensor 610. In one embodiment, the at least one battery 650 includes 3 "AAA" alkaline batteries. In an alternative embodiment, the at least one battery 650 includes 3 "C" alkaline batteries. In other embodiment, the at least one battery 650 may be any number of known batteries, including without limitation all known alkaline and nickel-cadmium batteries. It is to be appreciated that any number and type of rechargeable and/or non-rechargeable batteries can be utilized in connection with the claimed subject matter.

Figure 7:
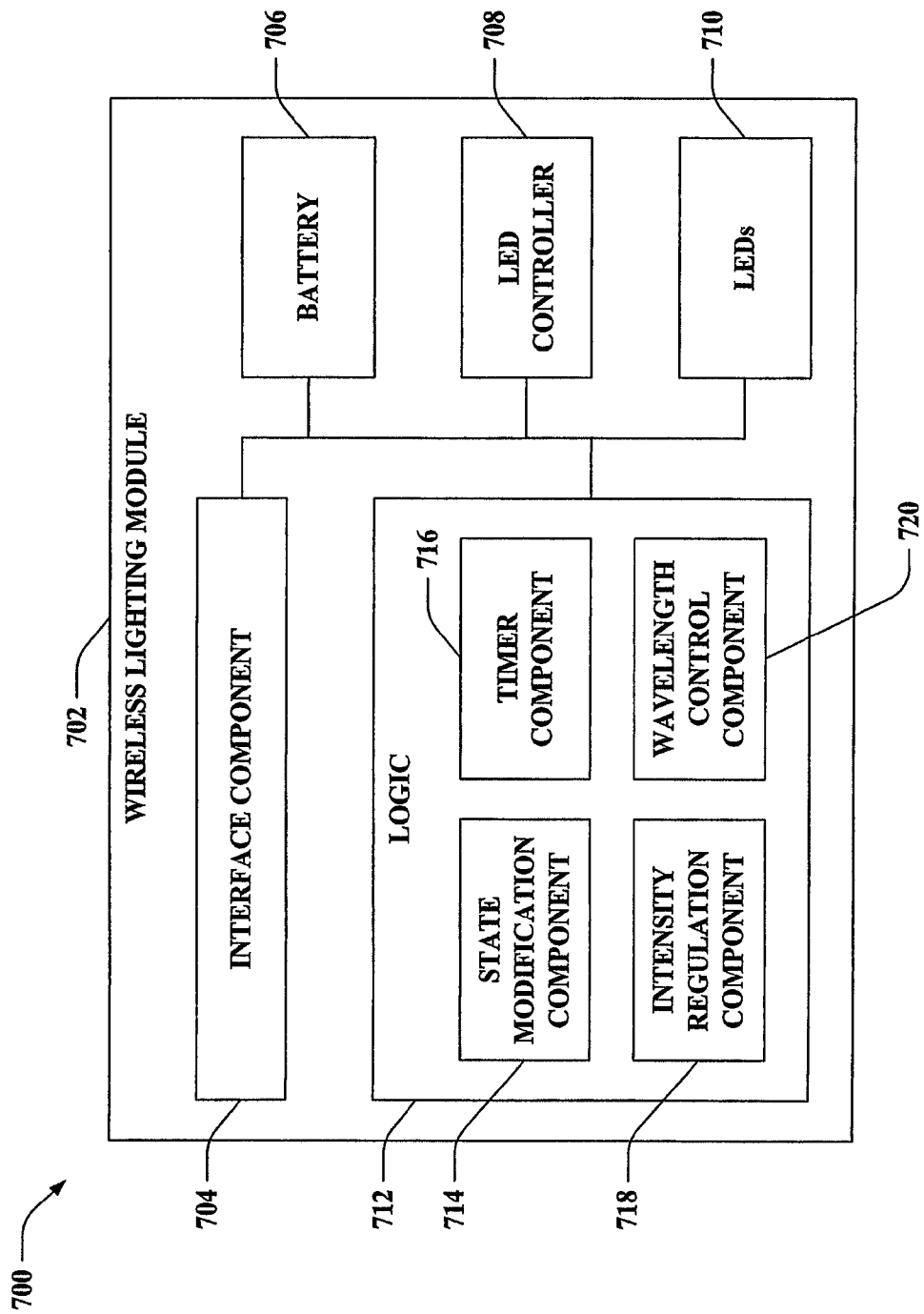
FIG. 7 illustrates a block diagram of a system that provides illumination with a wireless light.

With reference to FIG. 7, illustrated is a block diagram of a system 700 that provides illumination with a wireless light. System 700 includes a wireless lighting module 702 that can further comprise an interface component 704, a battery 706, an LED controller 708, LEDs 710, and/or logic 712. The wireless lighting module 702 can be incorporated into a housing (not shown). It is contemplated that any size and/or shape housing can be employed with the wireless lighting module 702. According to another illustration, the housing can include at least a portion that is moveable (e.g., manually by a user, automatically with a motor or the like, . . . ) to allow for directing emitted light. For example, a remote control can provide a signal to manipulate a moveable portion of the housing. Moreover, the housing can orient the LEDs 710 in substantially any manner to provide general lighting (e.g., illuminating an indoor or outdoor area), task lighting (e.g., reading), accent lighting, and so forth.

The interface component 704 can receive an input from a disparate device (e.g., the remote control 500 of FIG. 5, the sensor 610 of FIG. 6, . . . ). The interface component 704 can provide various adaptors, connectors, channels, communication paths, etc. to enable interaction with the disparate device. Pursuant to an illustration, the input can be wirelessly transmitted (e.g., via an RF signal, an IR signal, . . . ) from the disparate device to the interface component 704; thus, the interface component 704 can be a receiver and/or a transceiver that obtains the wirelessly transferred signal. By way of example, an infrared sensor or motion sensor can monitor occupancy in an environment and, upon detecting presence within the monitored environment, the sensor can transmit a wireless input to the interface component 704. It is to be appreciated that any type of sensors can be utilized in connection with the claimed subject matter such as, but not limited to, infrared sensors, light sensors, proximity sensors, acoustic sensors, motion sensors, carbon monoxide and/or smoke detectors, thermal sensors, electromagnetic sensors, mechanical sensors, chemical sensors, and the like. According to another example, any type of remote control can wirelessly communicate with the interface component 704. For instance, the remote control can be a stand-alone remote control (e.g., the remote control 300 of FIG. 3) and/or incorporated into a disparate device (e.g., incorporated into a key fob, a programmable wireless transceiver integrated in an automobile, . . . ). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the interface component 704 and/or via a network (e.g., local area network (LAN), wide area network (WAN), cellular network, . . . ). In accord with another example, radio frequency identification (RFID) can be utilized to provide the input to the interface component 704. As such, an RFID tag associated with a user can be detected when in range of the interface component 704, and lighting preferences of the particular user (e.g., retained in memory) can be effectuated in response to his or her detected presence.

Additionally or alternatively, the interface component 704 can be a sensor that can monitor a condition associated with the wireless lighting module 702 to generate the input. According to another example, the interface component 704 can be a connector, port, etc. that couples to such sensor.

Further, the interface component 704 can wirelessly transmit data (e.g., feedback, related to a current and/or anticipated future state, . . . ) to a remote device and/or sensor. By way of another example, the interface component 704 can wirelessly communicate with an interface component of a disparate wireless lighting module to enable coordinated operation between more than one wireless lighting module. Following this example, an input can be retransmitted within a network of wireless lighting modules, where the network of lighting modules can be dispersed within a geographic area.

The battery 706 can be any number and/or type of battery. For instance, the battery 706 can be a rechargeable battery. According to another example, the battery 706 can be a non-rechargeable battery. The battery 706 supplies power to the wireless lighting module 702 to enable installing, moving, replacing, etc. the wireless lighting module 702 at substantially any indoor or outdoor location while mitigating the need for expensive and time consuming wiring and/or utilization of aesthetically unpleasing and potentially inconvenient cords commonly associated with conventional lighting.

The LED controller 708 can obtain instructions from the logic 712 to control operation of the LEDs 710. The LED controller 708, for example, can receive and effectuate instructions to switch one or more LEDs 710 on and/or off, change an intensity of illumination (e.g., brightness), switch a wavelength of light emitted from the LEDs 710 (e.g., to change light color), manipulate direction of illumination (e.g., by moving, rotating, etc. one or more of the LEDs 710) and the like. Further, it is contemplated that any number, type, color, arrangement, etc. of LEDs 710 can be utilized with the wireless lighting module 702.

The logic 712 employs the input obtained by the interface component 704. The logic 712 can further include a state modification component 714, a timer component 716, an intensity regulation component 718, and/or a wavelength control component 720; however, it is to be appreciated that the logic 712 can include a subset of these components 714-720. The state modification component 714 utilizes the input obtained via the interface component 704 to generate an instruction to change a state of one of more of the LEDs 710. The state modification component 714 effectuates transitioning one or more LEDs 710 to an on state, an off state, etc. Further, the state modification component 714 can yield commands to strobe one or more LEDs 710 (e.g., periodically turning LED(s) 710 on and off with substantially any periodicity). According to an example, the state modification component 714 can decipher that a received input pertains to one or more of the LEDs 710. Moreover, the state modification component 714 can analyze the input to determine whether to instruct the LED controller 708 to change the state (e.g., compare an input from a sensor to a threshold, evaluate whether a condition has been met, based upon retrieved instructions corresponding to the input retained in memory, . . . ).

The timer component 716 can operate in conjunction with the state modification component 714. For instance, the timer component 716 can enable delaying state changes. Thus, turning the LEDs 710 on or off can be delayed for an amount of time by the timer component 716. Further, the amount of time for the delay can be predetermined, randomly selected, included with the input obtained by the interface component 704 (e.g., based on a number of times a button of a remote control is depressed, . . . ), etc. According to another example, the timer component 716 can conserve battery life by enabling the state modification component 714 to switch the LEDs 710 to an off state at a particular time of day, after an elapsed amount of time subsequent to an input that turned the LEDs 710 to the on state, and so forth. Pursuant to another illustration, the timer component 716 can operate in conjunction with the intensity regulation component 718 and/or the wavelength control component 720 described below.

The intensity regulation component 718 can alter the intensity (e.g., brightness) of the LEDs 710 based upon the received input from the interface component 704. The intensity can be changed by the intensity regulation component 718 adjusting a proportion of LEDs 710 in an on state to LEDs 710 in an off state. Additionally or alternatively, the intensity regulation component 718 can control the intensity of light emitted by each of the LEDs 710. According to an example, the interface component 704 can obtain RFID related input that identifies the presence of a particular user, and this user can have lighting preferences stored in memory (not shown) associated with the wireless lighting module 702. Following this example, the particular user's preferences may indicate that she desires the LEDs 710 to be dimly lit, which can be effectuated by the intensity regulation component 718. Pursuant to another example, upon a smoke detector or carbon monoxide detector sensing smoke or carbon monoxide, respectively, the intensity regulation component 718 can increase the brightness of the illumination of the LEDs 710 to a highest level (e.g., while the state modification component 714 can strobe the LEDs 710, the wavelength control component 720 can change the color, . . . ). It is to be appreciated, however, that the claimed subject matter is not limited to the aforementioned examples.

The wavelength control component 720 can change the wavelength (e.g., color) of light generated by the LEDs 710 as a function of the input obtained by the interface component 704. For example, the LEDs 710 can be color changing LEDs, and the wavelength control component 720 can yield commands to adjust the color based upon the input obtained by the interface component 704. By way of another example, the LEDs 710 can include subsets of LEDs that yield differing colors, and the wavelength control component 720 can select which of the LEDs 710 to turn to the on state to yield the desired color.

Figure 8:
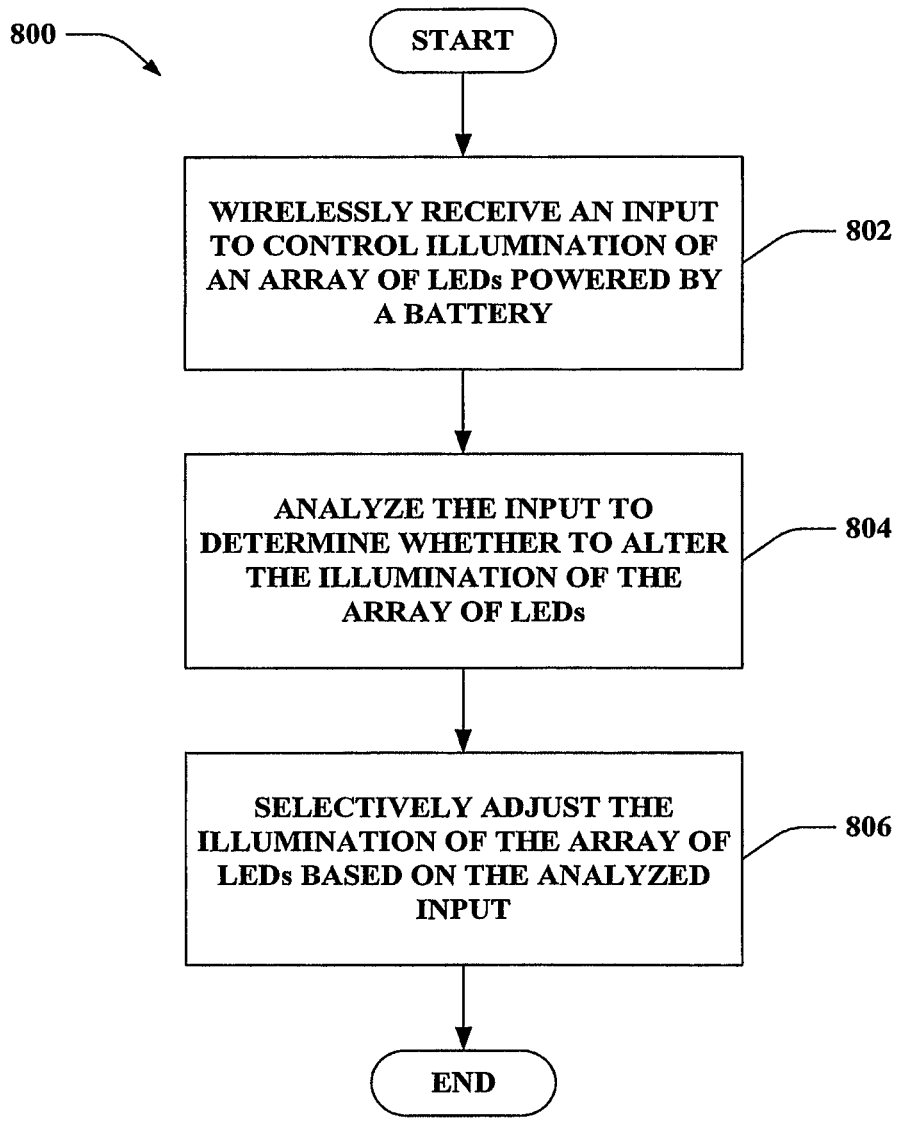
FIG. 8 illustrates a methodology that facilitates selectively emitting light in accordance with a wireless input.
Figure 9:
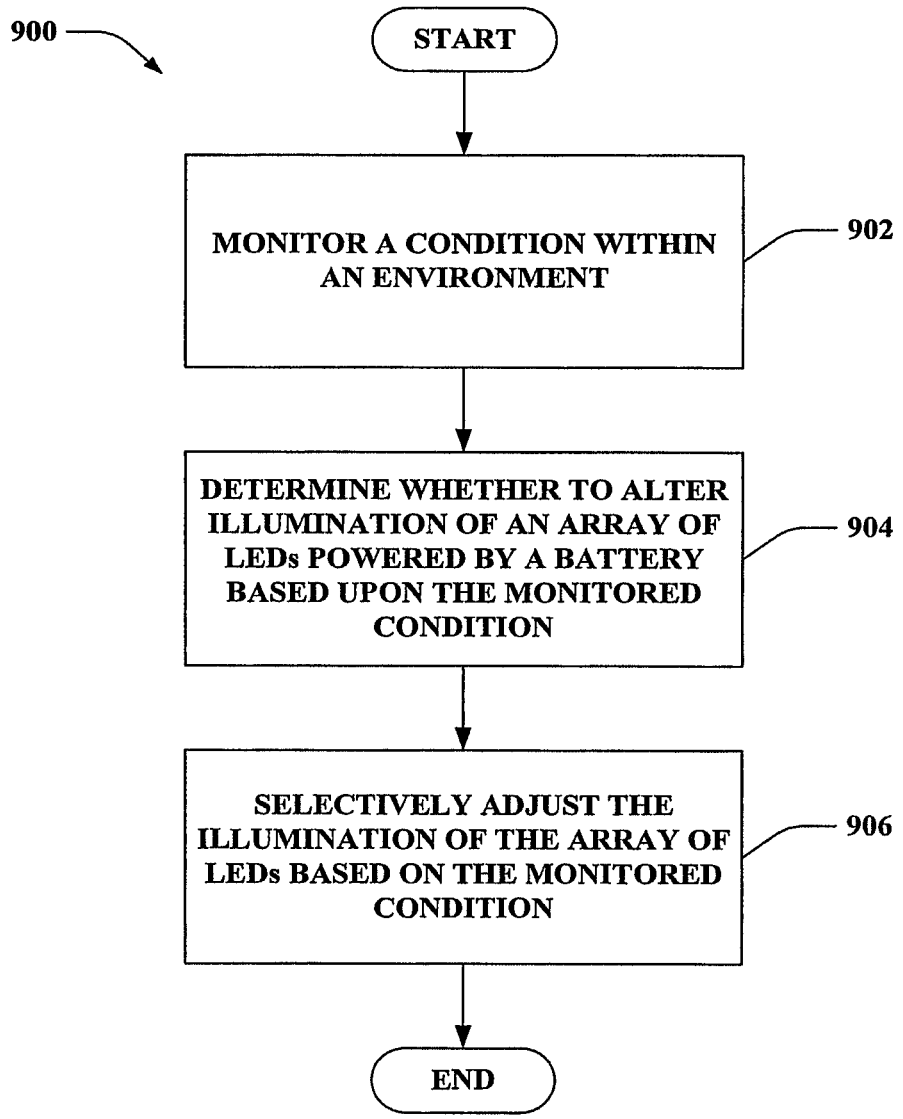
FIG. 9 illustrates a methodology that facilitates selectively emitting light based upon input from a sensor.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates selectively emitting light in accordance with a wireless input. At 802, an input can be wirelessly received to control illumination of an array of LEDs powered by a battery. The input can be obtained from any type of source (e.g., remote control, disparate wireless lighting module, differing device, sensor, . . . ). Moreover, the input can be provided from the source via an RF signal, an IR signal, and so forth. At 804, the input can be analyzed to determine whether to alter the illumination of the array of LEDs. For example, if the input provides a command to change the LEDs to an on state while the LEDs are currently in an off state, an instruction can be yielded to change the LEDs to the on state. According to another illustration, an amount of elapsed time can be tracked to identify when to effectuate a change in illumination. At 806, the illumination of the array of LEDs can be selectively adjusted based on the analyzed input. For example, LEDs can be transitioned to a differing state (e.g., turned on, turned off, . . . ), intensity of LEDs can be altered, color emitted can be changed, and so forth.

Now referring to FIG. 9, illustrated is a methodology 900 that facilitates selectively emitting light based upon input from a sensor. At 902, a condition within an environment can be monitored. The condition can relate to motion, presence, pressure, temperature, location, sound, chemicals, light, or any condition that can be tracked with a sensor. At 904, a determination can be effectuated relating to whether to alter illumination of an array of LEDs powered by a battery based upon the monitored condition. For example, the determination can be made by comparing the monitored condition to a threshold. Moreover, a current state associated with the array of LEDs can be evaluated to determine whether a change in illumination should be effectuated. At 906, the illumination of the array of LEDs can be selectively altered based on the monitored condition. Thus, for example, LEDs can be transitioned to an on state when motion is detected. By way of further illustration, the LEDs can be turned off when no motion is detected (e.g., for more than a predetermined amount of time).

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A wireless lighting module comprising:
   at least one light emitting diode (LED) configured to output light in a first illumination state and a second illumination state different from the first illumination state;
   a wireless transceiver;
   a timing component;
   an interface component configured to receive a lighting coordination input signal from a first disparate wireless lighting module and an environmental signal from an environmental sensor while the at least one LED is in the first illumination state, wherein the lighting coordination input signal received from the first disparate wireless lightning module is configured for use in controlling illumination of the wireless lighting module, and the environmental signal is indicative of a detected proximity of an object or a detected motion;
   a battery configured to supply power to the at least one LED; and
   a controller configured to:
      change an illumination state of the at least one LED of the wireless lighting module from the first illumination state to the second illumination state and initiate timing by the timing component in response to a received environmental signal indicating a detected proximity of an object or a detected motion;
      cause generation of a first illumination state control signal in response to the received environmental signal indicating a detected proximity of an object or a detected motion and cause transmission of the first illumination state control signal, via the wireless transceiver, to one or more disparate wireless lighting modules to change an illumination state of an LED of the one or more disparate wireless lighting modules from their first illumination state to their second illumination state;
      change the illumination state of the at least one LED of the wireless lighting module from the second illumination state to the first illumination state after the timing component indicates that a predetermined time period has elapsed and during which no additional environmental signal is received indicating a detected proximity of an object or a detected motion;
      cause generation of a second illumination state control signal in response to the timing component indicating that the predetermined time period has elapsed and cause transmission of the second illumination state control signal, via the wireless transceiver, to the one or more disparate wireless lighting modules to change the illumination state of the LED of the one or more disparate wireless lighting modules from their second illumination state to their first illumination state;
      change the illumination state of the at least one LED of the wireless lighting module from the first illumination state to the second illumination state and initiate timing by the timing component in response to a received first lighting coordination input signal from the first disparate wireless lighting module;
      change the illumination state of the at least one LED of the wireless lighting module from the second illumination state to the first illumination state after the timing component indicates that an elapsed amount of time has passed subsequent to the received first lighting coordination input signal from the first disparate wireless lighting module and during which no additional lighting coordination input signals are received;

change the illumination state of the at least one LED of the wireless lighting module from the second illumination state to the first illumination state in response to receipt of a second lighting coordination input signal from the first disparate wireless lighting module; and change the illumination state of the at least one LED of the wireless lighting module from the second illumination state to the first illumination state in response to the second lighting coordination signal being received from any of the one or more disparate wireless lighting control modules;

wherein the predetermined time period and the elapsed amount of time constitute different lengths of time;

wherein the first disparate wireless lighting module is included within the one or more disparate wireless lighting modules; and wherein in the first illumination state, the at least one LED is powered off, and in the second illumination state, the at least one LED is powered on.

2. The wireless lighting module of claim 1, wherein the interface component is configured to receive a remote control signal from a remote control, and the controller is configured to change the illumination state of the at least one LED of the wireless lighting module from the first illumination state to the second illumination state, initiate timing by the timing component in response to the received remote control signal, and change the illumination state of the at least one LED from the second illumination state to the first illumination state after the timing component indicates that the predetermined time period has elapsed.

3. The wireless lighting module of claim 2, wherein the controller is configured to cause generation of a third illumination state control signal in response to the received remote control signal and cause transmission of the third illumination state control signal, via the wireless transceiver, to the one or more disparate wireless lighting modules to change the illumination state of the LED of the one or more disparate wireless lighting modules from their first illumination state to their second illumination state.

4. The wireless lighting module of claim 1, wherein the wireless lighting module is included in at least one of a spotlight, a ceiling light, a path light, and a stair light housing.

5. The wireless lighting module of claim 1, wherein the interface component is configured to receive a remote control signal from a remote control, the remote control signal including a channel number, wherein the channel number identifies a group including the wireless lighting module and the one or more disparate wireless lighting modules, and the remote control is configured to receive the channel number via a dip switch.

6. The wireless lighting module of claim 1, wherein the controller is further configured to switch between a hibernation mode and an activated mode, and wherein the controller is configured to be activated and enter into the activated mode for a predetermined number of times per second, the controller is configured to monitor the wireless transceiver during the activated mode, and if the controller does not detect an output signal from the wireless transceiver during the activated mode, the controller is configured to return to the hibernation mode.

7. A method of operating a coordinated lighting unit, the coordinated lighting unit comprising at least one light emitting diode (LED), a wireless transceiver, a timing component, an interface component, a controller, and a battery, wherein the battery is configured to supply power to the at least one LED, the method comprising:

receiving, at the interface component of the coordinated lighting unit, an environmental sensor signal from an environmental sensor of the coordinated lighting unit while at least one LED of the coordinated lighting unit is in a first illumination state, wherein the environmental sensor signal is indicative of a detected proximity of an object or a detected motion;

changing an illumination state of the at least one LED of the coordinated lighting unit from the first illumination state to the second illumination state in response to the received environmental sensor signal;

initiating a timing component in response to the received environmental signal;

generating an illumination state control signal in response to the received environmental signal indicating a detected proximity of an object or a detected motion and transmitting the illumination state control signal, via a wireless transceiver of the coordinated lighting unit, to one or more disparate wireless lighting modules to change an illumination state of an LED of the one or more disparate wireless lighting modules from their first illumination state to their second illumination state;

changing the illumination state of the at least one LED of the coordinated lighting unit from the second illumination state to the first illumination state after the timing component indicates that a predetermined time period has elapsed and during which no additional environmental signal is received indicating a detected proximity of an object or a detected motion;

generating another illumination state control signal in response to the timing component indicating that the predetermined time period has elapsed;

transmitting the another illumination state control signal, via the wireless transceiver, to the one or more disparate wireless lighting modules to change an illumination state of an LED of the one or more disparate wireless lighting modules from their second illumination state to their first illumination state;

receiving a lighting coordination input signal from a first disparate wireless lighting module, via the interface component, while the at least one LED of the coordinated lighting unit is in the first illumination state;

changing the illumination state of the at least one LED of the coordinated lighting unit from the first illumination state to the second illumination state and initiating timing by the timing component in response to the received lighting coordination input signal from the first disparate wireless lighting module;

changing the illumination state of the at least one LED of the coordinated lighting unit from the second illumination state to the first illumination state after the timing component indicates that an elapsed amount of time has passed subsequent to the received lighting coordination input signal from the first disparate wireless lighting module and during which no additional lighting coordination input signals are received;

changing the illumination state of the at least one LED of the coordinated lighting unit from the second illumination state to the first illumination state in response to receipt of a second lighting coordination input signal from the first disparate wireless lighting module [prior to the timing component indicating that the elapsed amount of time has passed]; and wherein the predetermined time period and the elapsed amount of time constitute different lengths of time;

wherein the first disparate wireless lighting module is included within the one or more disparate wireless lighting modules; and wherein in the first illumination state, the at least one LED is powered off, and in the second illumination state, the at least one LED is powered on.

* * * * *